United States Patent [19]
Nishigai et al.

[11] Patent Number: 5,560,252
[45] Date of Patent: Oct. 1, 1996

[54] CHANGE LEVER SUPPORTING STRUCTURE

[75] Inventors: Yukio Nishigai; Shigeo Matsumoto, both of Shizuoka, Japan

[73] Assignee: Kabushiki Kaisha Atsumitec, Shizuoka, Japan

[21] Appl. No.: 456,322

[22] Filed: Jun. 1, 1995

[30] Foreign Application Priority Data

Jan. 9, 1995 [JP] Japan ..................... 7-001368

[51] Int. Cl.⁶ .......................... F16H 59/02; F16C 11/06
[52] U.S. Cl. .................. 74/473 P; 74/473 R; 403/114
[58] Field of Search ................. 74/473 R, 473 P; 403/114, 115, 122, 141, 142, 143

[56] References Cited

U.S. PATENT DOCUMENTS 3,547,474  12/1970  Colletti ................. 403/131 X
3,780,596  12/1973  Takahashi et al. ............ 74/473 P
4,646,585  3/1987   Srtrohmeyer et al. ........ 74/473 P X
4,873,884  10/1989  Yamada et al. ............ 403/114 X

*Primary Examiner*—Allan D. Herrmann
*Attorney, Agent, or Firm*—Nikaido, Marmelstein, Murray & Oram LLP

[57] ABSTRACT

A cap for supporting a spehrical fulcrum member of a change lever between the cap itself and a hemispherical bottom wall of a housing, and a retainer for pressing the cap through an elastic ring are fitted to the housing. The retainer and the housing are provided at opposed peripheral surfaces of thereof with an engagement claw and an engagement hole, respectively. Therefoere, by only fitting the retainer to the housing, it is possible to easily secure the retainer to the housing.

10 Claims, 7 Drawing Sheets

CHANGE LEVER SUPPORTING STRUCTURE

BACKGROUND OF THE INVENTION

1. Field of the Invention

The present invention relates to a change lever supporting structure in a change device for controlling a transmission of a motor vehicle, and more particularly, to an improvement of a change lever supporting structure, comprising: a cylindrical housing formed at a lever bracket and having hemispherical bottom wall, a cap fitted to the housing for rotatably supporting a spherical fulcrum member of the change lever between the cap itself and the bottom wall; and a retainer fitted and secured to the housing for pressing and holding the cap through an elastic ring from above.

2. Description of the Prior Art

Such a change lever supporting structure is known as disclosed, for example, in Japanese Patent Application Laid-open No. 229950/90.

In the known structure, in order to secure the retainer to the housing, a plurality of securing members such as bolts are used. Therefore, the numbers of parts and assembling processes are increased, leading to an increase in manufacturing cost.

SUMMARY OF THE INVENTION

Accordingly, it is an object of the present invention to provide a supporting structure of the change lever in which the retainer can easily and reliable be secured to the housing without using the securing members, and a fulcrum member of the change lever can always be supported stably by the housing.

To achieve the above object, according to a first feature of the present invention, there is provide a change lever supporting structure, comprising: a housing formed at a lever bracket and having a hemispherical bottom wall; a cap for rotatably interpose a spherical fulcrum member of the change lever between the cap itself and the bottom wall; a retainer for pressing the cap from the above through an elastic ring; the cap and retainer being fitted to the housing, and an elastic engagement claw and an engagement hole provided at opposed peripheral surfaces of the retainer and the housing, respectively, the engagement claw and the engagement hole being engaged with each other for preventing the retainer from being moved upward.

With the first feature, the engagement claw and the engagement hole can be engaged with each other only by fitting the retainer to the housing. Therefore, the retainer can easily be secured to the housing without using securing members. Further, by using only the elastic ring between the cap and the retainer, the engagement claw and hole can be enagaged, such engagement can be kept without backlash, and the fulcrum member can be held in cooperation with the cap. Therefore, the structure can be simplified and the change lever can be supported stably.

In addition to the first feature, according to a second feature, a tip end of the engagement claw provided at the retainer is inclined upward, and an upper surface of the engagement hole provided in the housing is inclined upward in a radially outward direction.

With the second feature, if the retainer recieved an upward load from a side of the cap, an engagement force between the engagement claw and the hole can further be enhanced, thereby reliably preventing the retainer from being disengaged.

The above and other objects, features and advantages of the invention will become apparent from preferred embodiments taken in conjunction with the accompnying drawings.

DESCRIPTION OF THE PREFERRED EMBODIMENTS

The present invention will now be described by way of preferred embodiments taken in conjunction with the accompanying drawings.

Figure 1:
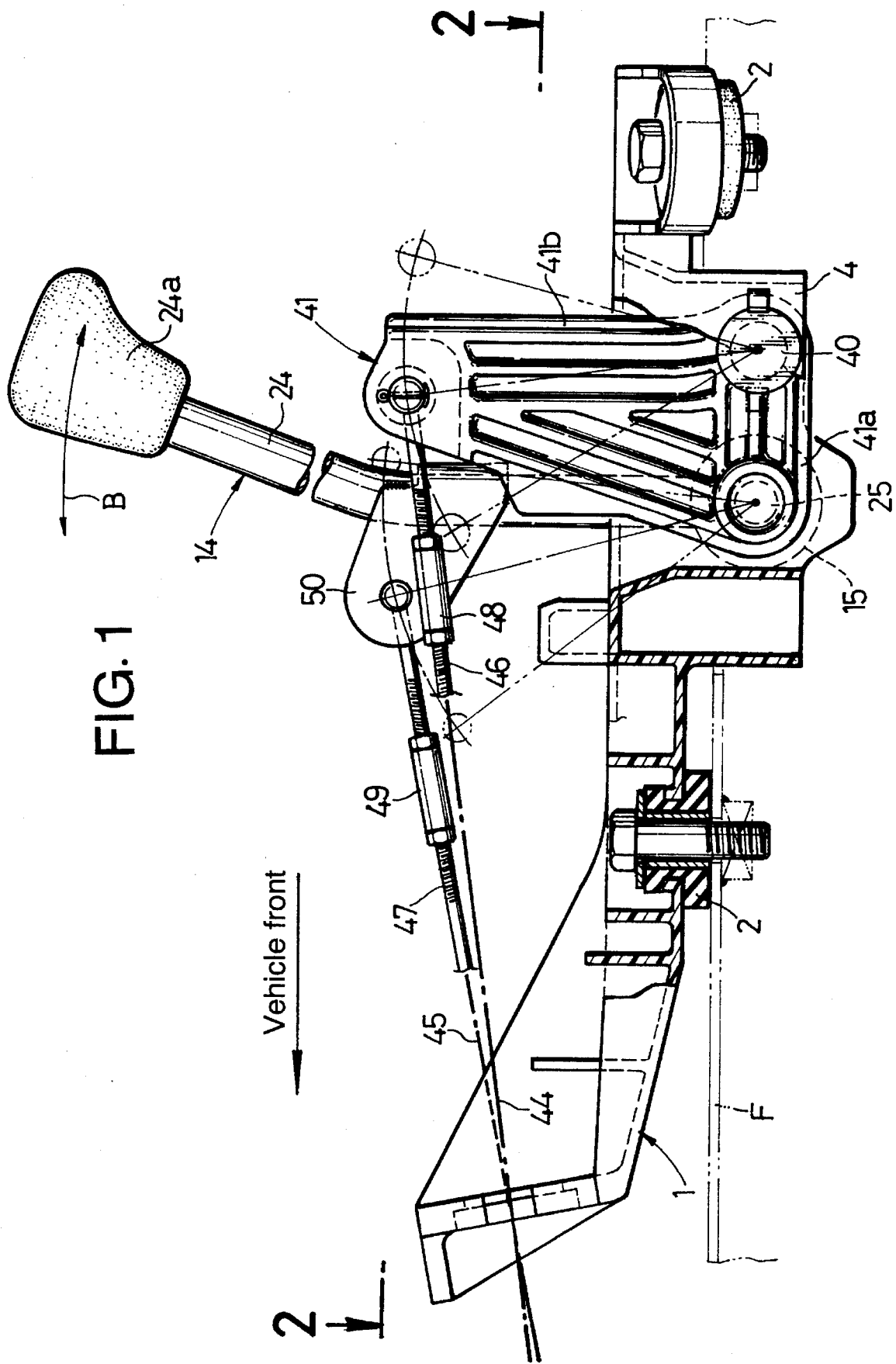
FIG. 1 is a side view of a change lever supporting structure according to a first embodiment of the present invention, partly in longitudinal section.
Figure 2:
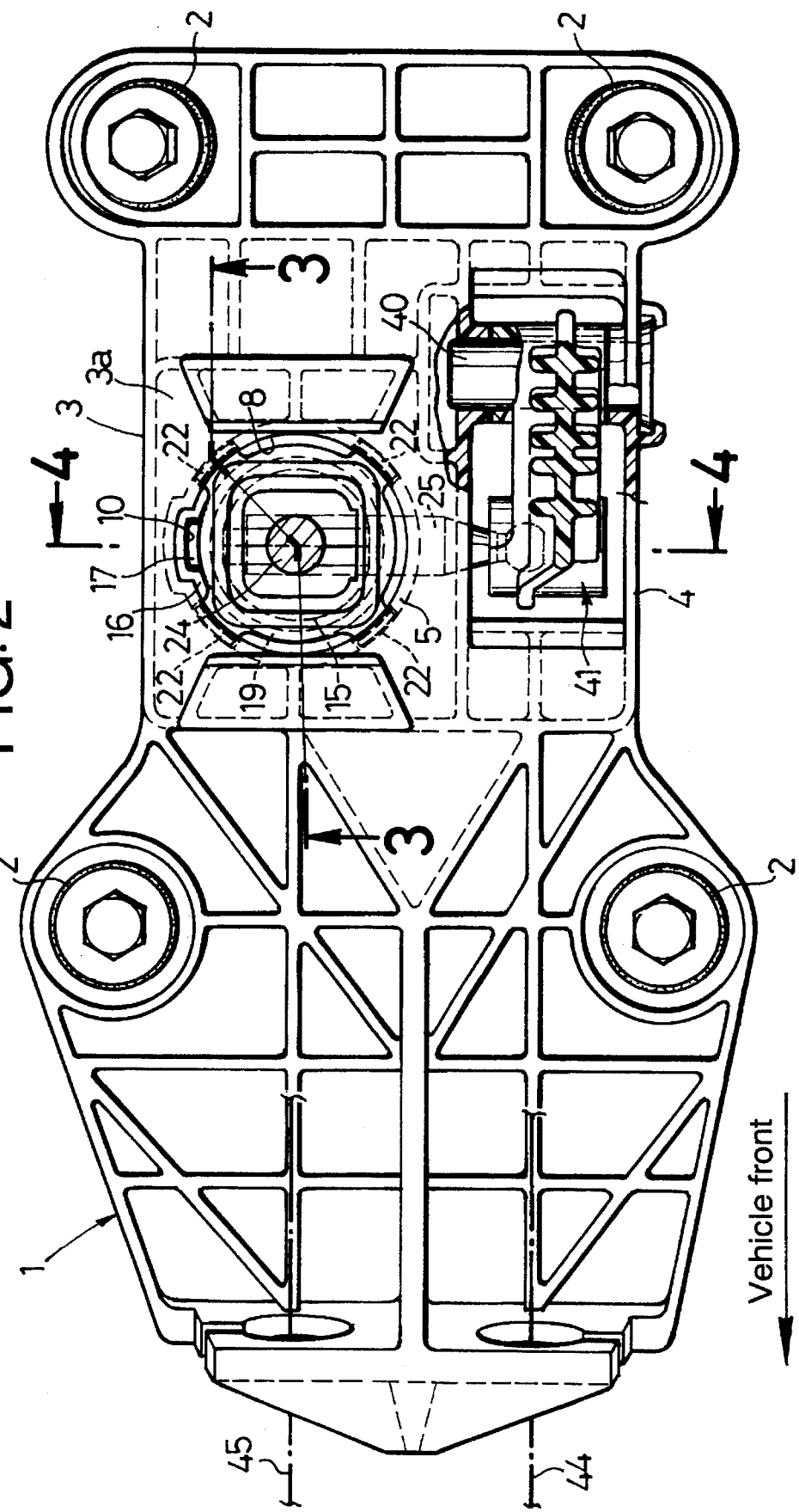
FIG. 2 is a sectional view taken along a line 2—2 in FIG. 1.
Figure 3:
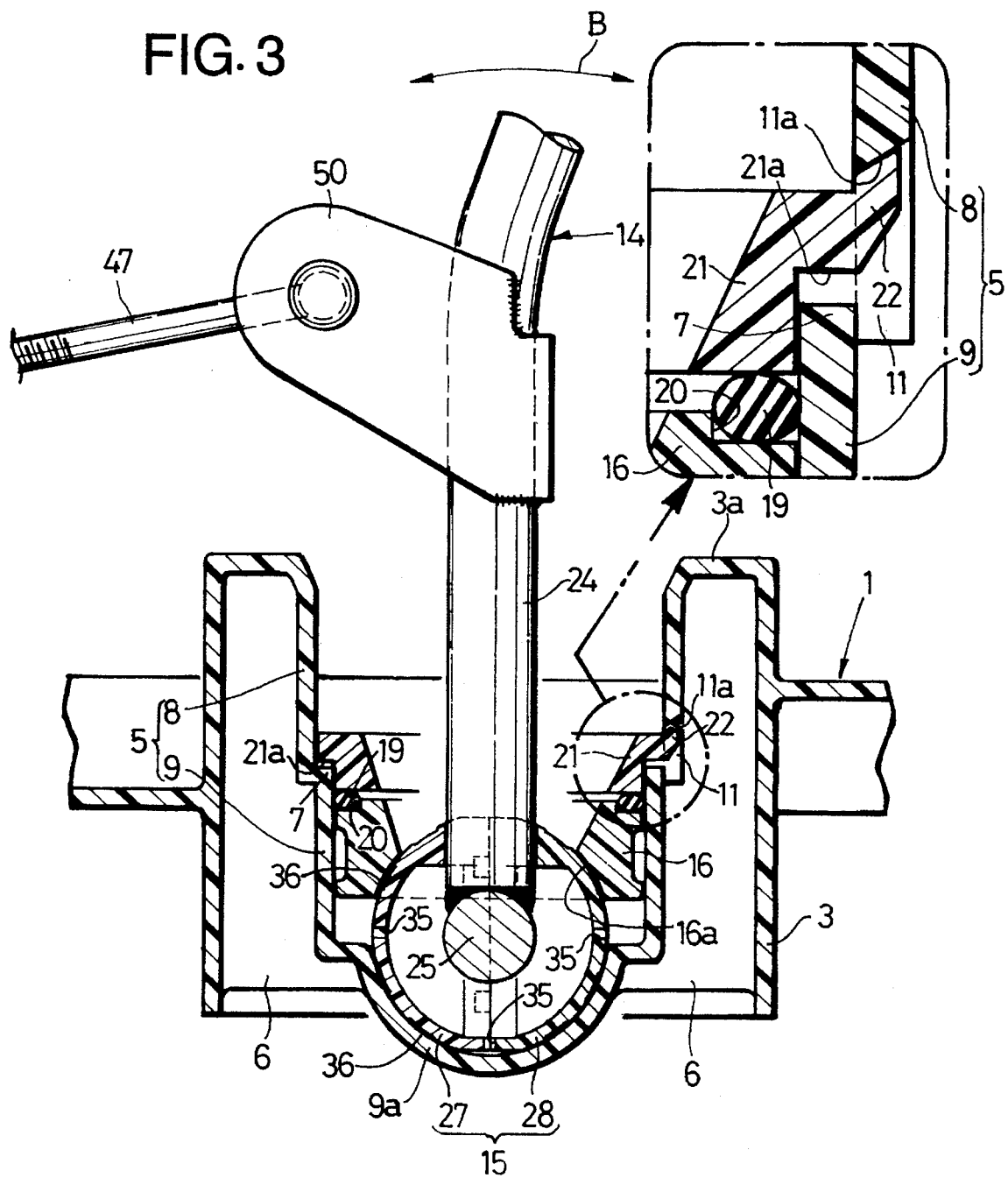
FIG. 3 is an enlarged longitudinal sectional view taken along a line 3—3 in FIG. 2.
Figure 4:
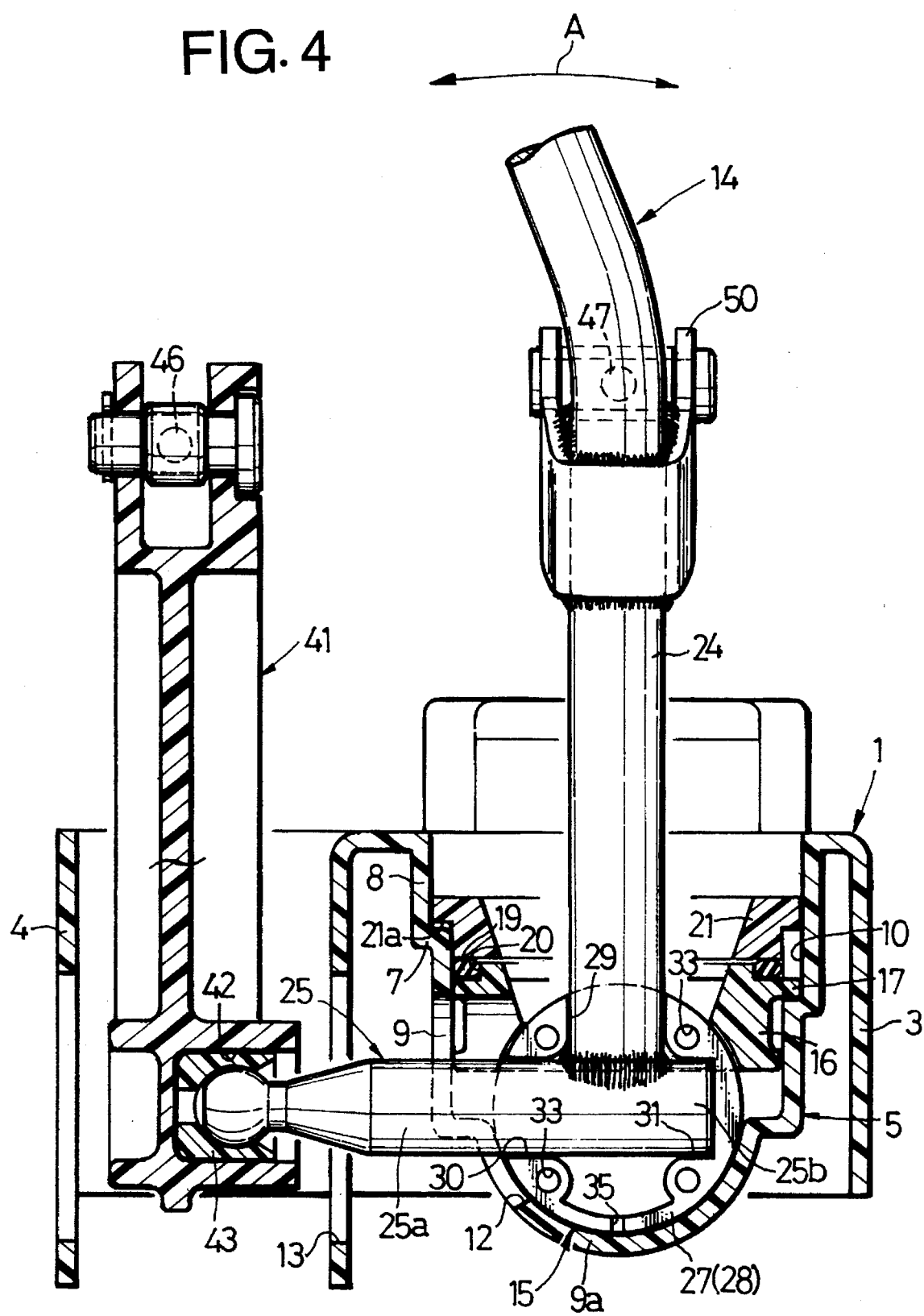
FIG. 4 is an enlarged longitudinal sectional view taken along a line 4—4 in FIG. 2.

First, referring to FIGS. 1 to 4, a lever bracket 1 made of resin is mounted on a floor board of a vehicle through a mount rubber 2. The lever bracket 1 is integrally provided with first and second towers 3 and 4 which are juxtaposed in a lateral direction of the vehicle and which commonly includes a partition wall (FIGS. 2 and 4). The first tower 3 is of substantially square in section, and is opened at its lower surface. The second tower 4 is rectangular which is long in a longitudinal direction of the vehicle and opened at its upper and lower ends.

As can be seen from FIGS. 3 and 4, the first tower 3 is integrally and continuously formed with a housing 5 which is suspended downward from an upper end wall 3a of the first tower 3 along an axis of the tower 3. Opposed peripheral surfaces of the housing 5 and the first tower 3 are connected by a plurality of radial reinforcing ribs 6.

The housing 5 includes an upper large-diameter cylindrical portion 8 and a lower small-diameter cylindrical portion 9 which are juxtaposed so as to sandwich a step portion 7 provided at an intermediate portion of the housing 5. The small-diameter cylindrical portion 9 includes a hemispherical bottom wall 9a. The small-diameter cylindrical portion 9 is formed in an inner surface thereof with a guide groove 10 which extended vertically. (see FIGS. 2 and 4).

A plurality of engagement holes 11 are formed in the large-diameter cylindrical portion 8 so as to face the step portion 7. Vertically slotted holes 12 and 13 are formed in opposed side walls of the small-diameter cylindrical portion 9 and the second tower 4.

A spherical fulcrum member 15 of the change lever 14 is rotatably engaged with the hemispherical bottom wall 9a of the small-diameter cylindrical portion 9. A cap 16 made of resin is relatively rotatably engaged with the fulcrum member 15 from the above and is fitted to an inner peripheral surface of the small-diameter cylindrical portion 9. At that time, a rotation-proof projection 17 (FIGS. 2 and 5) projected from one side surface of the cap 16 is engaged with the guide groove 10. A surface 16a of the cap 16 which is in contact with an outer peripheral surface of the fulcrum member 15 is formed into a spherical surface so as to fit such outer peripheral surface.

The cap 16 is formed at its outer periphery of the upper end thereof with an annular recess 20 for holding an elastic ring 19 such as an O-ring. A substantially upper half of the ring 19 is exposed, in its free state, from an upper surface of the cap 16. An annular retainer 21 (FIG. 5) made of resin for compressing the elastic ring 19 from the above so as to press and hold the cap 16 is fitted to inner peripheral surfaces of the large- and small-diameter cylindrical portions 8 and 9. A plurality of elactic engagement claws 22 projected from an outer periphery of the retainer 21 are engaged with the engagement holes 11.

As can be seen from FIG. 3, a tip end of the engagement claw 22 is inclined upward. When the retainer 21 is to be fitted to the large-diameter cylindrical portion 8, the engagement claw 22 is deflected inward by an inner surface of the large-diameter cylindrical portion 8, and when the engagement claw 22 reaches a position corresponding to the engagement hole 11, the engagement claw 22 engages the engagement hole 11 by its own resilient force.

An upper surface 11a of the engagement hole 11 is also inclined upward in a radially outward direction. Therefore, if the engagement claw 22 engaging the engagement hole 11 receives an upward repulsion force, the engaging force between the engagement claw 22 and the engagement hole 11 can further be enhanced. The retainer 21 is provided with a step portion 21a which is opposed to the step portion 7 of the housing 5, so that when the retainer 21 is fitted to the housing 5, the compression deformation of the elastic ring 19 by abutment between both the step portions 7 and 21a can be restrained.

In this manner, the fulcrum member 15 is rotatably interposed between the cap 16 and the bottom wall 9a of the housing 5 with a repulsion force of the elastic ring 19.

As can be seen from FIGS. 1 and 4, the change lever 14 includes a bar-like main lever 24 provided at its upper end with a knob 24a, and a bar-like subsidiary lever 25 welded to a lower end of the main lever 24 so as to form a T-shape. The subsidiary lever 25 includes long and short rod portions 25a and 25b. The long rod portion 25 largely projects from one side of the main lever 24 to pass through the slotted holes 12 and 13 and extends into the second tower 4. The short rod portion 25b slightly projects from the other side of the main lever 24. The fulcrum member 15 is secured to a junction between the main and the subsidiary levers 24 and 25 so as to cover the junction.

Figure 5:
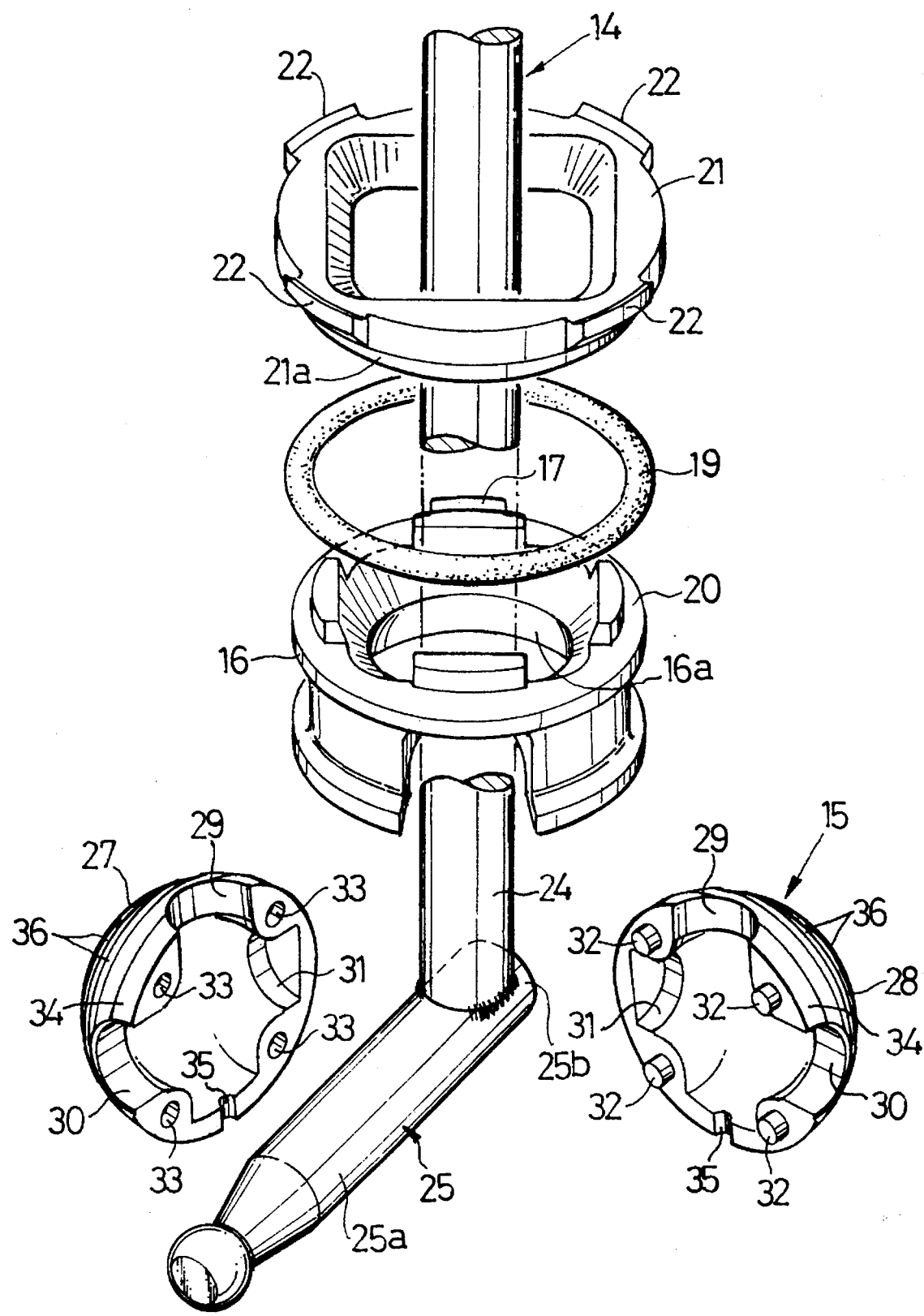
FIG. 5 is an exploded perspective view of an essential portion of the change lever supporting structure.
Figure 6:
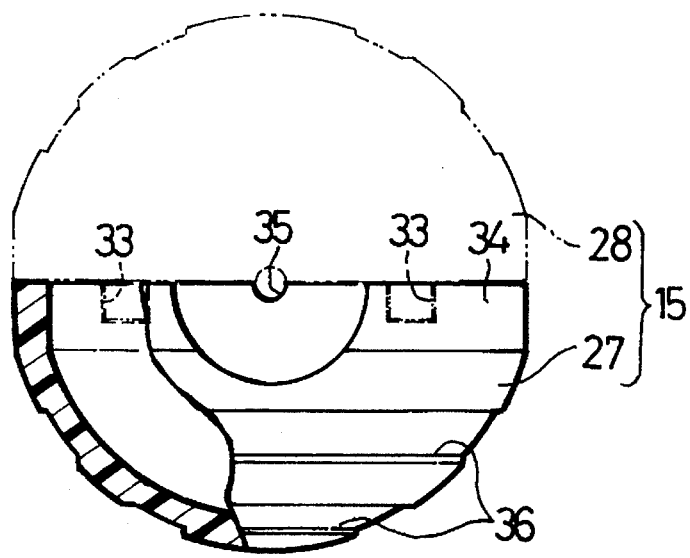
FIG. 6 is a bottom view of the fulcrum member in the change device, partly broken.

As can be seen from FIGS. 4 to 6, the fulcrum member 15 is formed into a hollow structure by coupling a pair of cup-like hemispherical bodies 27 and 28 made of resin. The hemispherical bodies 27 and 28 have basically symmetrical shapes with respect to a mating surface therebetween. Each of the hemispherical bodies 27 and 28 is formed at an end surface thereof with supporting recesses 29, 30 and 31 extending three directions. These supporting recesses 29, 30 and 31 are fitted to outer peripheries of the main lever 24, as well as the long and short rod portions 25a and 25b of the subsidiary lever 25. At that time, centers of both the hemispherical bodies 27 and 28 agree with a junction of axes of the main and subsidiary levers 24 and 25.

A plurality of positioning holes 33 are formed at the end surface of the hemispherical body 27, and a plurality of positioning projections 32 are formed at the end surface of the hemispherical body 28. By lightly fitting the positioning projections 32 into the positioning holes 33, both the hemispherical bodies 27 and 28 can temporarily be coupled.

The coupling state between the hemispherical bodies 27 and 28 is reliably retained by sandwiching them between the cap 16 and the bottom wall 9a of the housing 5, as described above.

A grease is previously filled in each of the hemispherical bodies 27 and 28. The hemispherical bodies 27 and 28 are formed at their lower mating surfaces and other appropriate portions with grease holes 35 for exuding the grease to the outer peripheries of the fulcrum member 15. The hemispherical bodies 27 and 28 are also formed at outer peripheries thereof with a lubricant groove 36.

Figure 7:
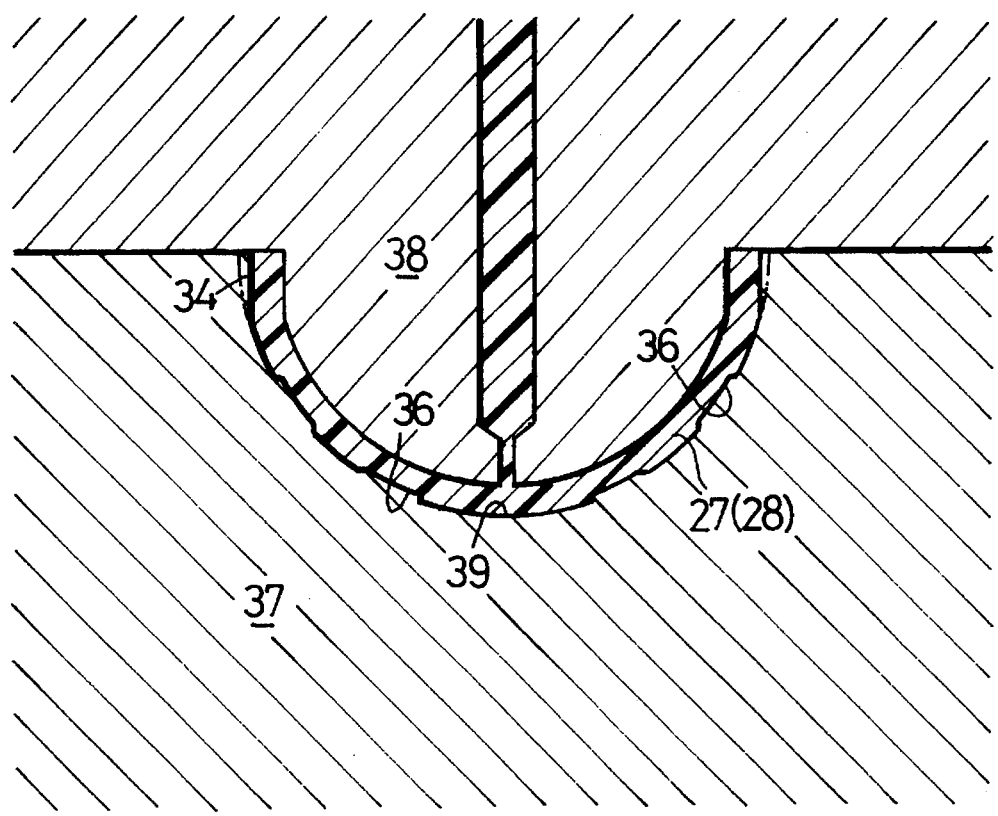
FIG. 7 is a view for explaining a moulding procedure of the hemispheres composing the fulcrum member.

Further, the hemispherical bodies 27 and 28 are formed at outer peripheries of the end portions thereof with chamfers 34 which are to be formed during molding. Therefore, when the hemispherical bodies 27 and 28 are to be formed by a pair of metal dies 37 and 38 as shown in FIG. 7, if juncture surfaces of both the metal dies 37 and 38 are brought to agreement with the end surfaces of the hemispherical bodies 27 and 28, it is possible to prevent a burr which protrudes from the produced cavity such as to infiltrate into a clearance between the juncture surfaces of the metal dies 37 and 38, from projecting outward of the outer peripheries of the spherical surface of the hemispherical bodies 27 and 28. Therefore, even if the hemispherical bodies 27 and 28 are assembled into the housing 5 with a burr left as it is, it is possible to prevent the burr from injuring mating members.

As is shown in FIGS. 1, 2 and 4, a bell-crank 41 made of resin is mounted to the second tower 4 through a horizontal pivot shaft 40. The bell-crank 41 includes a horizontal arm 41a having a swinging end extended forward, and a vertical arm 41b having a swinging end extended upward. A bush 43 turnably mounted to a tip end of the subsidiary lever 25 is slidably fitted to a connection hole 41 formed in the inner surface of the horizontal arm 41a. One end of a push–pull select wire 44 is connected to the vertical arm 41b through a rod 46 having a turnbuckle 48.

As is shown in FIGS. 1 and 3, one end of a push–pull shift wire 45 is connected to a connection piece 50 connected to an intermediate portion of the main lever 24 through a rod 47 having a turnbuckle 49.

The other ends of the select wire 44 and the shift wire 45 are respectively connected to a select member and a shift member of a transmission (not shown).

The operation of this embodiment will be described below.

If an operator grasps the knob 24a and moves the main lever 24 in a select direction A (in a lateral direction of the vehicle as shown in FIG. 4) about the fulcrum member 15, the vertically swingable subsidiary lever 25 drives the horizontal arm 41a of the bell-crank 41 so as to swing the vertical arm 41b in a longitudinal direction of the vehicle. Therefore, a select motion is applied to the transmission through the select wire 44, and a desired gear train is selected. Then, if the operator turns the main lever 24 about the fulcrum member 15 in a shift direction B (in a longitudinal direction of the vehicle), a shift motion is applied to the transmission through the shift wire 45, thereby establishing the previously selected gear train.

Because the pair of the hemispherical bodies 27 and 28 forming the fulcrum member 15 are formed with three supporting recesses 29, 30 and 31 in which the main and subsidiary levers 24 and 25 intersect each other to form a T-shape. Therefore, it is possible to easily and reliably prevent a relative displacement between the change lever 14 and the fulcrum member 15 in the axial and rotational directions. Therefore, when the change lever 14 is operated, a rotational sliding movement between each contacting surfaces of the housing 5, the cap 16 and the fulcrum member 15 which is lubricated with the grease is smoothly generated.

Further, grease which is exuded from the fulcrum member 15 through the grease holes 35 is supplied to the contacting surfaces, an excellent lubricating condition is always maintained.

The cap 16 and the bottom wall 9a of the housing 5 cooperatively sandwitches the fulcrum member 15 with a repulsion force, a frictional wear generated therebetween can automatically be compensated to prevent a backlash from being generated. Further, when the elastic ring 19 is fitted into the housing 5, the elastic ring 19 permits an engagement between the engage claw 22 and the engage hole 11 and holds such engagement state without generating a backlash. Therefore, an attachment member for the retainer 21 becomes unnecessary, which enhances an assembling property and simplifies the structure.

Further, the tip end of the engage claw 22 of the retainer 21 is inclined upward, and the upper surface 11a of the engage hole 11 of the housing 5 is also inclined upward in a radially outwardly. Therefore, if the retainer 21 receives an upward load from the side of the cap 16, the engagement claw 22 further strengthens the engagement with the engage hole 11, which reliably prevents the retainer 21 from being disengaged from the housing 5.

Figure 8:
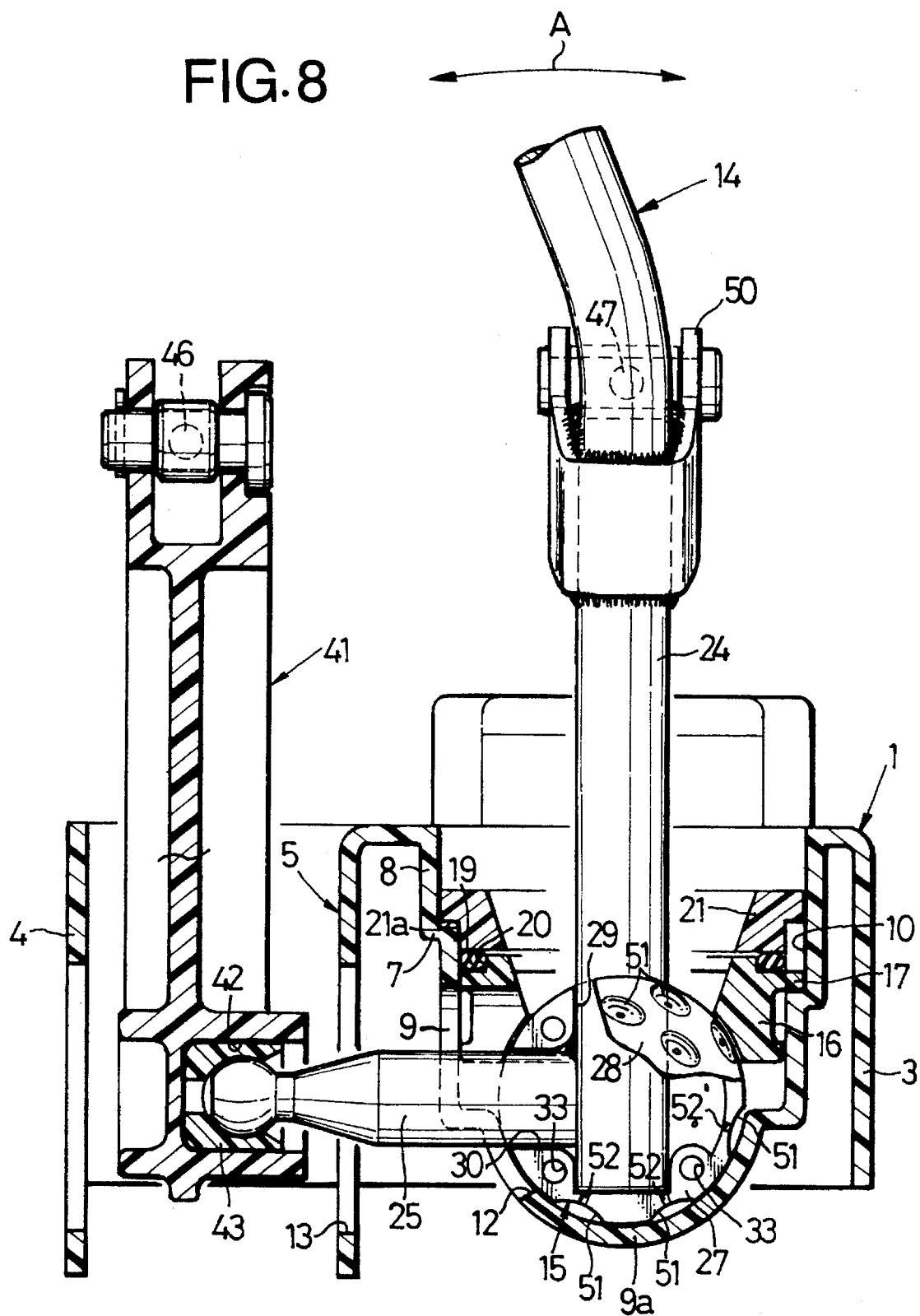
FIG. 8 is a sectional view similar to FIG. 4 but illustrating a second embodiment of the invention.

FIG. 8 shows a second embodiment of the present invention. In the second embodiment, the subsidiary lever 25 intersects one side surface of the main lever 24 such as to form a T-shape, the hemispherical bodies 27 and 28 are provided at outer peripheral surfaces thereof with a large number of dimples 51 instead of the lubricant groove 36, and each of the hemispherical bodies 27 and 28 is also provided with a grease hole 52 which is opened at a bottom surface of each the dimple 51. Other structures of the second embodiment are the same as those of the above-described first embodiment. In FIG. 8, portions or components corresponding to those in the first embodiment are designated by like reference characters.

According to the second embodiment, a lubrication around the fulcrum member 15 can be conducted more effectively.

Although the embodiments of the present invention have been described in detail, it will be understood that the present invention is not limited to the above-described embodiments, and various modifications in design may be made without departing from the spirit and scope of the invention defined in claims. For example, each of the hemispherical bodies 27 and 28 may be formed into a hollow structure.

What is claimed is:

1. A change lever supporting structure, comprising:

a housing formed at a lever bracket and having a hemispherical bottom wall;

a cap for rotatably interposing a spherical fulcrum member of a change lever between the cap itself and said bottom wall;

a retainer for pressing said cap from above through an elastic ring; said cap and retainer being fitted to said housing, and an elastic engagement claw and an engagement hole provided at opposed peripheral surfaces of said retainer and said housing, respectively, and engaged with each other for preventing said retainer from being moved upward.

2. A change lever supporting structure according to claim 1, werein a tip end of said engagement claw provided at said retainer is inclined upward, and an upper surface of said engagement hole provided in the housing is inclined upwardly in a radially outward direction.

3. A change lever supporting structure according to claim 1 or 2, wherein said housing comprises an upper large-diameter cylindrical portion and a lower small-diameter cylindrical portion with an intermediate step interposed between both the cylindrical portions, said small-diameter cylindrical portion includes said hemispherical bottom wall, and said large-diameter cylindrical portion includes said engagement hole, said cap being fitted to an inner peripheral surface of said small-diameter cylindrical portion, and whrerein said retainer is formed into a cylindrical shape provided at its intermediate portion with a step portion such that the retainer is fitted to inner peripheral surfaces of said large- and small-diameter cylindrical portions, an amount of compression deformation of said elastic ring caused when interposed between said cap and said retainer being restrained by abutment between said step portion of said retainer and said step of said housing.

4. A change lever supporting structure according to claim 3, wherein said cap is formed at an outer periphery of an upper end thereof with an annular recess for holding said elastic ring.

5. A change lever supporting structure according to claim 3, wherein said small-diameter cylindrical portion is formed at an inner surface thereof with a vertically extended guide groove, and said cap is formed at one side surface thereof with a rotation-proof projection engaged with said guide groove.

6. A change lever supporting structure according to any one of claims 1 or 2, wherein said housing, said cap and said retainer are made of resin.

7. A change lever supporting structure according to claim 4, wherein said small-diameter cylindrical portion is formed at an inner surface thereof with a vertically extended guide groove, and said cap is formed at one side surface thereof with a rotation-proof projection engaged with said guide groove.

8. A change lever supporting structure according to claim 3, wherein said housing, said cap and said retainer are made of resin.

9. A change lever supporting structure according to claim 4, wherein said housing, said cap and said retainer are made of resin.

10. A change lever supporting structure according to claim 5, wherein said housing, said cap and said retainer are made of resin.

* * * * *